(12) United States Patent
Fenger et al.

(10) Patent No.: US 7,917,789 B2
(45) Date of Patent: Mar. 29, 2011

(54) SYSTEM AND METHOD FOR SELECTING OPTIMAL PROCESSOR PERFORMANCE LEVELS BY USING PROCESSOR HARDWARE FEEDBACK MECHANISMS

(75) Inventors: Russell J. Fenger, Beaverton, OR (US); Anil Aggarwal, Portland, OR (US); Shiv Kaushik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 11/864,800

(22) Filed: Sep. 28, 2007

(65) Prior Publication Data

US 2009/0089598 A1 Apr. 2, 2009

(51) Int. Cl.
*G06F 1/08* (2006.01)
(52) U.S. Cl. ......... 713/322; 713/300; 713/310; 713/323
(58) Field of Classification Search .................. 713/300, 713/310, 322, 323
See application file for complete search history.

(56) References Cited

U.S. PATENT DOCUMENTS

| | | | |
|---|---|---|---|
| 7,219,245 B1 | 5/2007 | Raghuvanshi | |
| 2004/0139302 A1 | 7/2004 | Flautner et al. | |
| 2005/0132238 A1* | 6/2005 | Nanja | 713/300 |
| 2006/0253715 A1* | 11/2006 | Ghiasi et al. | 713/300 |
| 2008/0235364 A1* | 9/2008 | Gorbatov et al. | 709/224 |

OTHER PUBLICATIONS

Office Action received for Great Britain Patent Application No. GB0817747.9, mailed on Jan. 22, 2009, 7 pages.

* cited by examiner

*Primary Examiner* — Thomas Lee
*Assistant Examiner* — Zahid Choudhury
(74) *Attorney, Agent, or Firm* — Joni D. Stutman

(57) ABSTRACT

An embodiment of the present invention is a system and method relating to adaptive power management using hardware feedback to select optimal processor frequencies and reduce power/watt. In at least one embodiment, the present invention is intended to optimize processor frequency and power/watt usage based on the hardware feedback and processor stall behavior.

21 Claims, 3 Drawing Sheets

Mobile System: (5 P-states:2333, 2000, 1666, 1333, 1000)

| SiSoftware Sandra on Mobile System | DBS Score | Acnt2 Score | Acnt2 Perf Loss | DBS Power | Acnt2 Power | Acnt2 Power Savings |
|---|---|---|---|---|---|---|
| Dhrystone ALU (MIPS) | 21505 | 21509 | 0.0% | 41.42 | 40.46 | 2.3% |
| Whetstone iSSE3 (MFLOPS) | 14801 | 14801 | 0.0% | | | |
| Integer x8 iSSE4 (it/s) | 128501 | 128496 | 0.0% | 36.53 | 35.64 | 2.4% |
| Float x4 iSSE2 (it/s) | 69426 | 69422 | 0.0% | | | |
| RAM Bandwidth Int Buff'd iSSE2 (MB/s) | 3936 | 3878 | 1.5% | 33.7 | 29.67 | 12.0% |
| RAM Bandwidth Float Buff'd iSSE2 (MB/s) | 3945 | 3922 | 0.6% | | | |
| Cache/Memory Combined (MB/s) | 20592 | 20312 | 1.4% | 40 | 29.54 | 26.2% |

*Fig. 2A*

Server System: (4 P-states:3000, 2666, 2333, 2000)

| SiSoftware Sandra on Server System | DBS Score | Acnt2 Score | Acnt2 Perf Loss | DBS Power | Acnt2 Power | Acnt2 Power Savings |
|---|---|---|---|---|---|---|
| Dhrystone ALU (MIPS) | 43537 | 43461 | 0.2% | 284.25 | 284.12 | 0.0% |
| Whetstone iSSE3 (MFLOPS) | 36735 | 35735 | 2.7% | | | |
| Integer x8 iSSE4 (it/s) | 325049 | 324006 | 0.3% | 251.06 | 248.74 | 0.9% |
| Float x4 iSSE2 (it/s) | 250564 | 250580 | 0.0% | | | |
| RAM Bandwidth Int Buff'd iSSE2 (MB/s) | 3761 | 3723 | 1.0% | 264.29 | 224.72 | 15.0% |
| RAM Bandwidth Float Buff'd iSSE2 (MB/s) | 3715 | 3748 | -0.9% | | | |
| Cache/Memory Combined (MB/s) | 44187 | 44118 | 0.2% | 268.07 | 229.77 | 14.3% |

*Fig. 2B*

SYSTEM AND METHOD FOR SELECTING OPTIMAL PROCESSOR PERFORMANCE LEVELS BY USING PROCESSOR HARDWARE FEEDBACK MECHANISMS

FIELD OF THE INVENTION

An embodiment of the present invention relates generally to power management of a platform and, more specifically, to an adaptive power management policy using hardware feedback.

BACKGROUND INFORMATION

Various mechanisms exist for power management of a platform. Existing approaches rely on adjusting processor frequency based on processor utilization. In computer systems using adaptive power management policies, the processor performance state (P-State) adjusts based on demand. As the processor utilization decreases, the processor may transition to a lower performance state to conserve power. As the processor utilization increases, the processor may transition to a higher performance state and may consume more power. In many operating systems, the target performance level, or P-State selection, is based on the combination of processor utilization and the effective P-State as determined by the GV3 Hardware Feedback using the IA32_APERF and IA32_MPERF machine status registers (MSRs). The IA32-APERF/IA32-MPERF ratio, returned in the GV3 Hardware Feedback, provides an effective P-State over the last accounting period by dividing the actual frequency clock count by the maximum frequency clock Count while the core is executing (in C0 C-state).

In most processors, for instance available from Intel Corp., the P-States are coordinated among multiple cores in the processor. If one core is 100% busy and selects the highest frequency to run, the other cores in the same processor also run at the higher frequency. Because the cores are coordinated, the GCV Hardware Feedback provided by the IA32_APERF and IA32_MPERF MSRs may be combined to find the effective frequency of the core, instead of merely using the last P-State, to more accurately select the new target P-state.

BRIEF DESCRIPTION OF THE DRAWINGS

The features and advantages of the present invention will become apparent from the following detailed description of the present invention in which:

FIGS. 2A-B are tables showing empirical data from early experiments using embodiments of the invention.

DETAILED DESCRIPTION

Figure 1:
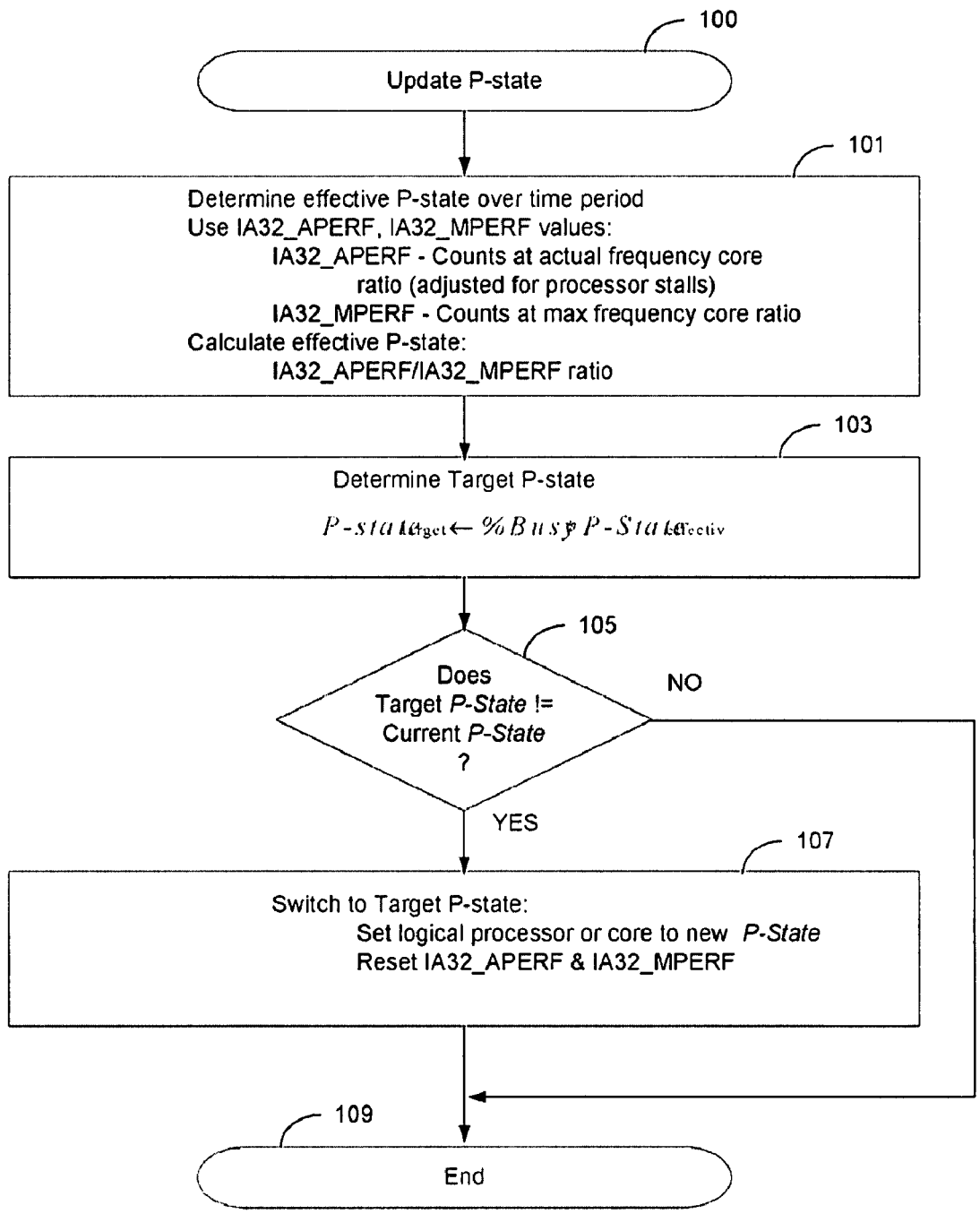
FIG. 1 is a flow diagram illustrating an exemplary method for optimizing the P-State of a processor, according to an embodiment of the invention.

An embodiment of the present invention is a system and method relating to adaptive power management using hardware feedback to select optimal processor frequencies and reduce power/watt. In at least one embodiment, the present invention is intended to optimize processor frequency and power/watt usage based on the hardware feedback adjusted for processor stall behavior. When the processor is stalled due to memory access, bus activity, or the like, the feedback may appear lower, i.e. the APERF to MPERF ratio will be lower. This will result in the OS selecting a lower P-State for the processor, which will result in additional power savings with little impact to performance. In some embodiments, the P-State may be updated by circuitry in or outside of the processor, firmware, or other services external to the OS. It should be noted that embodiments of this invention may be used for any type of stall in which the processor can run at a reduced performance state with little or no impact to the workload performance.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

An improved adaptive power management system and method is disclosed, herein. Initial experiments, by the authors, have shown that despite the processor being 100% busy, periodic reduction in target P-State selection during times of processor stalls will result in additional power savings with negligible performance loss. Given that the target P-State selection is a function of the GV3 Hardware Feedback, embodiments of the invention are designed to achieve optimal target P-State selection, with minimal operating system overhead, by adjusting the GV3 Hardware Feedback based on processor stall behavior. Two alternative approaches are described to adjust the GV3 Hardware Feedback based on processor stall behavior. The first approach modifies IA32_APERF to return an adjusted count based on processor stall activity which will reduce the ratio returned in the GV3 Hardware Feedback. The second approach adjusts GV3 Hardware Feedback using a new MSR, or counter, to adjust the IA32_APERF/IA32_MPERF ratio based on processor stall activity. Other alternatives may be contemplated by combining these two approaches.

For illustrative purposes, the usage of the MSRs is briefly discussed. The IA32_APERF MSR (hereafter, "APERF") counts at the actual processor frequency and the IA32-MPERF (hereafter, "MPERF") register counts at the maximum frequency. For example, on a platform having a maximum frequency of 2 GHz, if the current actual frequency of the processor, based on P-State selection, at a given time is 1 GHz, then the APERF to MPERF ratio (IA32_APERF/IA32_MPERF) would be 50%.

An embodiment of the invention alters the value of the APERF as would be seen by the OS, or other control logic, in determining the P-State, based on stalling behavior. In other words, the APERF will return an adjusted ratio, based on the stalling behavior, as discussed more fully below. By adjusting the returned value of APERF, the ratio APERF/MPERF, as seen by the OS, would be altered, as well. In existing systems, if the processor is identified as 100% busy, even if stalling occurs 90% of the time, the processor will remain at the highest frequency (maximum P-State) for the entire workload run.

In some operating systems, the OS re-evaluates the counters every 100 ms, and adjusts the P-State, accordingly. Varying OSs may have a different periodicity of P-State update. Thus, embodiments of the invention will alter the P-State selection based oil a combination of workload utilization (% busy) and stall behavior. Whereas, existing systems do not use a stall adjusted APERF/MPERF ratio to select the P-State.

If during the time between P-state evaluations there are little or no stalls, the processor may stay at a higher frequency.

Referring now to FIG. 1, there is shown an exemplary method for selecting an optimal processor performance level, according to an embodiment of the invention. The P-State is to be updated by the exemplary method 100. In block 101, the effective P-state over a time period is determined. This may be done by using the machine state registers (MSRs) IA32_APERF (APERF) and IA32_MPERF (MPERF) values, where APERF counts the actual frequency core ratio (adjusted for processor stalls) and MPERF counts at the maximum frequency core ratio. The effective P-State is calculated as the APERF/MPERF ratio. While the machine state registers (MSRs) IA32_APERF and IA32_MPERF are used, embodiments of the invention use the MSRs with a novel variation over existing OS use of the MSRs. In embodiments of the invention, APERF counts at actual frequency core ratio, but is adjusted for processor stalls. MPERF continues to count at maximum frequency core ratio. The effective P-state is calculated as the ratio of the modified APERF divided by the MPERF value. This calculation varies from the calculation used in existing systems in that the processor stall time is taken into account.

The target P-State is determined in block 103. The P-State is calculated as the percent of time the processor is busy (% Busy), i.e., utilization, but not idle, multiplied by the effective P-State (P-State$_{effective}$) A determination is made as to whether the target P-State is not equal to the current P-State, in block 105. If they are not the same, then the P-State is switched in block 107. This may be performed by setting the logical processor or core to a new P-State, as determined above. Once the P-State is set, APERF and MPERF are reset, as well. In another embodiment, the APERF and MPERF values are not actually reset, but the last known values of APERF and MPERF are stored and then subtracted from the latest counts in the MSRs. The actual implementation simply results in the ratio calculation of the changes in the counters over a given time period, but the details of the calculation may vary based on architecture or design. Processing then continues at block 109.

An embodiment where the APERF is modified provides a very good architecture (IA) differentiation from existing systems, resulting in minimal operating system overhead due to the current operating system (OS) usage of the IA32_APERF/IA32_MPERF ratio in target P-State selection. Reducing the IA32_APERF based on processor stalls directly reduces the ratio, which will automatically, with sufficient stalls, result in a lower target P-State being selected.

Another embodiment requires the use of an additional counter in the OS which may be used to adjust the GV3 Hardware Feedback. The trade-off for this embodiment is that it will require more operating system overhead, but fewer processor changes.

Workload performance can be expressed based on the time it takes to complete execution. The time it takes to run at the highest P-State is represented as $T_{P0}$, and the time in a target P-State is represented as $T_{target}$. The performance loss, Perf$_{loss}$, facts from running in a lower target P-State may be expressed as follows:

$$Perf_{loss} = \frac{T_{target}}{T_{P0}} - 1 \qquad (eq.\ 1.0)$$

The above values may be separated into on and off die phases denoted as $T^{on-die}$ and $T^{off-die}$. As can be seen in the formula below (where performance loss can be calculated using the time (T) at a target P-State relative to the time at the maximum frequency P-State P0):

$$Perf_{loss} = \frac{T_{target}^{on-die} + T_{target}^{off-die}}{T_{P0}^{on-die} + T_{P0}^{off-die}} - 1 \qquad (eq.\ 2.0)$$

Since execution time during processor stalls does not scale, i.e., the stall time does not change at the same rate as the processor frequency, the current P-State (represented by i) off-die processor time $T_i^{off-die}$ would be equivalent to the target and P0 off-die times. In this discussion, "off-Die" means that the processor is stalled and waiting for something to happen. Similarly, since execution time scales with processor frequency, then the C0 cycle count $C0_i$ (i.e., the current running state of the processor) for the current P-State relative to the target P-State C0 cycle count and the P0 P-State C0 cycle count can be used to derive equations 3.1 and 3.2. It should be noted that the cycle count of running at the current P-State/cycle count of running at the target P-State would be the same ratio as the frequency at the current P-State/frequency at the target P-State. The ratio would be the same as the frequency ratio, but one is counting actual cycles at the frequency, C0. $C0_i$ Counts at the current P-State, so it may count slower than if it were counting at the maximum P-State.

$$T_{target}^{on-die} = T_i^{on-die}\left(\frac{C0_i}{C0_{target}}\right) \text{ and} \qquad (eq.\ 3.1)$$

$$T_{P0}^{on-die} = T_i^{on-die}\left(\frac{C0_i}{C0_{P0}}\right) \qquad (eq.\ 3.2)$$

When the target P-State while running on-die (non-stalling) processing is P0 (max frequency) and the target P-State while running off-die (stalling) processing is at some lower frequency P-State, such as P3, additional power savings can be achieved with negligible performance loss, as shown in equation 4, below:

$$Perf_{loss} = \frac{T_{P0}^{on-die} + T_{P3}^{off-die}}{T_{P0}^{on-die} + T_{P0}^{off-die}} - 1 \qquad (eq.\ 4.0)$$

The amount of performance loss will depend on how accurate the processor stalls can be detected and how quickly the P-State adjustment can be achieved. The ability to do more accurate stall detection and more frequent P-State adjustments directly in the processor will provide the best performance.

One approach to calculating a new APERF value may be achieved by adapting the above formulas and using equations 3.1 and 3.2 to cycle counts using the current cycle count ($C0_i$) and the max frequency cycle count ($C0_{P0}$):

$$Perf_{loss} = \frac{T_i^{on\text{-}die}\left(\frac{C0_i}{C0_{target}}\right) + T_i^{off\text{-}die}}{T_i^{on\text{-}die}\left(\frac{C0_i}{C0_{P0}}\right) + T_i^{off\text{-}die}} - 1 \quad \text{(eq. 5.0)}$$

Solving the above for $C0_{target}$ results in:

$$C0_{target} = \frac{C0_{P0}}{Perf_{loss}\left(1 + \frac{T_i^{off\text{-}die}}{T_i^{on\text{-}die}}\frac{C0_{P0}}{C0_i}\right) + 1} \quad \text{(eq. 6.0)}$$

Replacing $T^{off\text{-}die}/T^{on\text{-}die}$ with the stall ratio results in:

$$C0_{target} = \frac{C0_{P0}}{Perf_{loss}\left(1 + \frac{C0_{stalls}}{(C0_i - C0_{stalls})}\frac{C0_{P0}}{C0_i}\right) + 1} \quad \text{(eq. 7.0)}$$

The $C0_{target}$ calculated above demonstrates one approach to calculating a new APERF value. It should be noted that in the calculation of the target frequency, the performance loss value is to be used as a constant. Upon reading the description herein, it will be apparent to those of skill in the art that the performance loss may be pre-selected based on the applications running on the processor. For purposes of empirical study, the authors have used a value of 5% performance loss, as acceptable in the above equations. The calculated $C0_{target}$ may be returned as the new APERF value in the MSR. Use of this equation results in a lower value for APERF than would be returned in existing systems, because stalling is taken into account. Thus, the APERF/MPERF ratio is smaller due to the adjustment of the APERF value. A lower ratio results in a P-State at a lower frequency, which results in energy savings.

It should be noted that a stalled processor is in a different C-State than an idle processor. An idle processor is doing nothing, but a stalled processor is busy, but waiting. A processor may be at one of a variety of C-States. For instance, state C0 indicates that the processor is running. C1, C2 or C3 are different idle states that the processor may be in. The deepest C-State will provide the most power savings.

It should also be noted that the OS will often overestimate the processing frequency needed. For instance, if the target P-State is calculated at 2/3 ratio, the OS may set the actual frequency at 2.33/3 of the maximum, to ensure that the process has sufficient processing power. Another OS may employ a policy where if the processor is running at 100% busy, the P-State frequency is updated to the maximum frequency and then allowed to migrate naturally, if possible, to a lower frequency in the next update period.

FIGS. 2A-B are tables showing empirical data from early experiments using the above formula. For purposes of illustration, results using embodiments of the invention are labeled "ACNT2" in the charts. Embodiments of the invention have shown double-digit power savings with negligible performance loss on Sandra memory test. More information about the standard benchmarking Sandra tests may be found at on the public Internet at URL www*sisoftware*net/. It should be noted that periods have been replaced with asterisks in URLs in this document to avoid inadvertent hyperlinks. For instance, FIG. 2A shows preliminary experimental results using a mobile system having five (5) possible P-States of: 2333, 2000, 1666, 1333, 1000. FIG. 2B shows preliminary experimental results using a server system having four (4) possible P-States of: 3000, 2666, 2333 and 2000.

The first column indicates the specific benchmark run. The second column, labeled "DBS Score" indicates the Demand Based Switching (DBS) test score without ACNT2 usage. The third column, labeled "Acnt2 Score", indicates the score with ACNT2 usage. The fourth column, labeled "Acnt2 Perf Loss", indicates the test score percent performance loss when Using ACNT2. The last three columns show the DBS power (in Watts), ACNT2 power (in Watts), and the percent power savings in Watts when using ACNT2.

In another embodiment, instead of using just the APERF MSR in the calculation of the target P-State, as discussed above, a new counter may be added to the processor, for instance, "SPERF," to count the stalls. In this embodiment, SPERF is subtracted from APERF before being used to calculate the ratio with MPERF. In another embodiment, a counter may be implemented in the processor that indicates the ratio directly, and accounting for stalls may be used. These embodiments would require additional modification to the processor architecture to generate these new MSRs, and possibly modification of the OS if the calculation is made after receiving the MSR data. Another embodiment may provide a control in the processor to adjust how the APERF MSR is generated. For instance, when the flag is ON, APERF may be automatically adjusted by the stall count. The OS enabling effort is small when embodiments modify the APERF register before the OS calculates the ratio. Thus, the OS will not change the way in which the calculation is performed, but merely result in a calculation modified by adjusting the variables.

In embodiments of the invention, the MSR counters are generated and adjusted in hardware, before being accessed by the OS. Each logical processor will have its own MSRs. A core may have more than one logical processor. However, a single core may only run at one frequency. If the resulting calculation provides a lower frequency than another logical processor on the same core in the socket, then a maximum would be used for each logical processor. However, it is contemplated that future processors will allow cores on the same socket to run at different frequencies.

Figure 3:
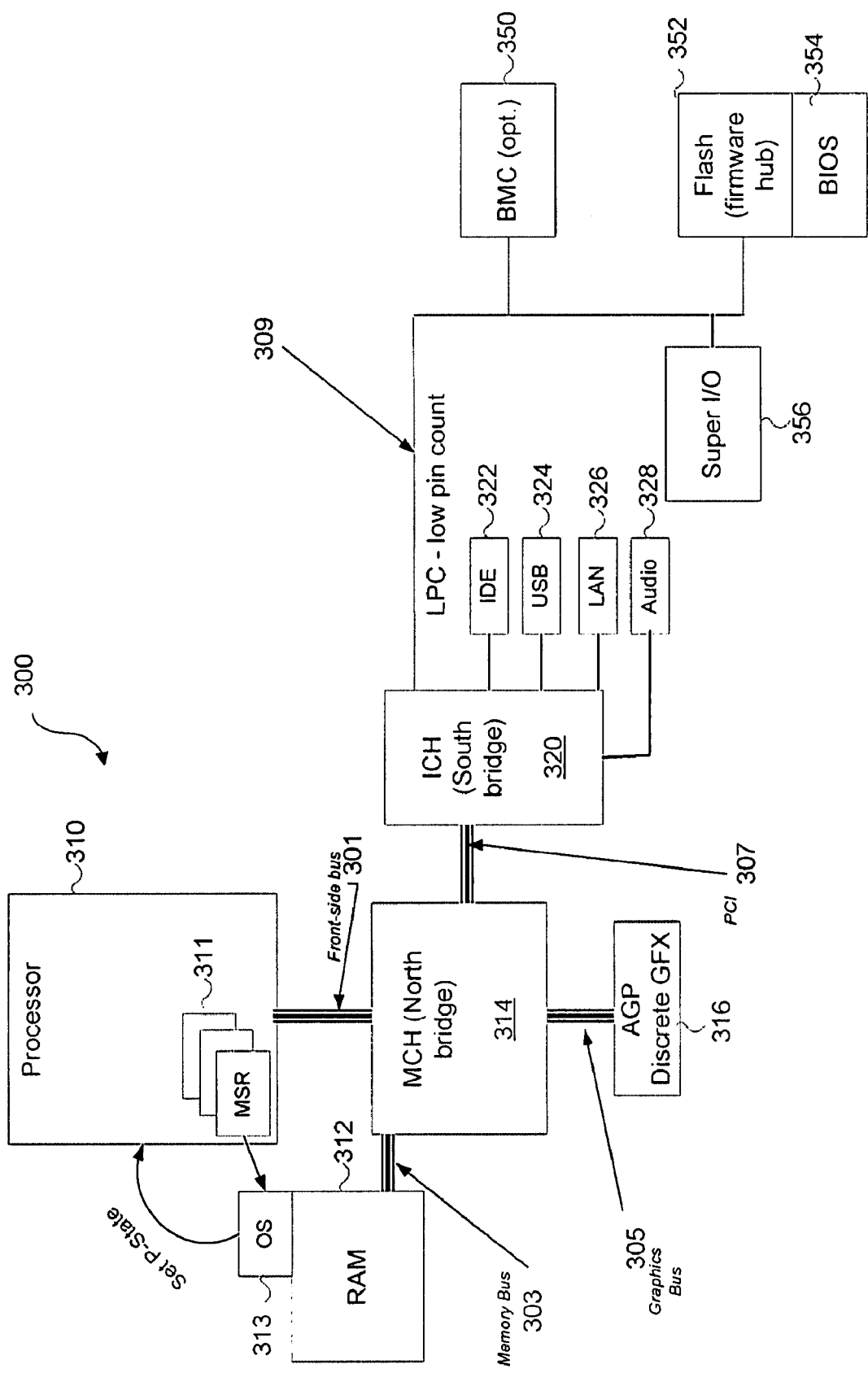
FIG. 3 is a block diagram of an exemplary system on which embodiments of the invention may be implemented.

FIG. 3 is a block diagram of an exemplary system 300 on which embodiments of the invention may be implemented. Processor 310 communicates with a memory controller hub (MCH) 314, also known as North bridge, via the front side bus 301. The MCH 314 communicates with system memory 312 via a memory bus 303. An operating system (OS) 313 typically resides in the system memory to be executed by the processor 310. The MCH 314 may also communicate with an advanced graphics port (AGP) 316 via a graphics bus 305. The MCH 314 communicates with an I/O controller hub (ICH) 320, also known as South bridge, via a peripheral component interconnect (PCI) bus 307. The ICH 320 may be coupled to one or more components such as PCI hard drives (not shown), legacy components such as IDE 322, USB 324, LAN 326 and Audio 328, and a Super I/O (SIO) controller 356 via a low pin count (LPC) bus 356.

Processor 310 may be any type of processor capable of executing software, such as a microprocessor, digital signal processor, microcontroller, multi-core processor, or the like. Though FIG. 3 shows only one such processor 310, there may be one or more processors in platform hardware 300 and one or more of the processors may include multiple threads, multiple cores, or the like.

Memory 312 may be a hard disk, a floppy disk, random access memory (RAM), read only memory (ROM), flash memory, or any other type of medium readable by processor 310. Memory 312 may store instructions for performing the execution of method embodiments of the present invention.

Non-volatile memory, such as Flash memory 352, may be coupled to the IO controller via a low pin count (LPC) bus 309. The BIOS firmware 354 typically resides in the Flash memory 352 and boot up will execute instructions from the Flash, or firmware.

In some embodiments, platform 300 is a server enabling server management tasks. This platform embodiment may have a baseboard management controller (BMC) 350 coupled to the ICH 320 via the LPC 309.

The processor 310 may have several machine status registers (MSRs) 311 on-board. In an embodiment, one MSR is an IA32_APERF register, as described above. Another MSR is an IA32_MPERF register, as described above. These registers 311 may be accessed by the OS 313 to be used in the determination of a target P-State for the processor 310. To minimize the impact on the OS, embodiments of the invention may be implemented on the processor so that the registers are modified before the OS retrieves them. In an alternative embodiment, the OS may be modified to alter the calculation of the APERF/MPERF ratio to determine a target P-State. In another embodiment, other registers may be implemented on the processor 310 to calculate stall time and be introduced into the calculation either in processor circuitry, or by the OS.

While most existing systems use the OS to change the processor P-State, some existing or future architectures may use logic external to the OS to perform these actions, for instance circuitry in or outside of the processor, firmware services, code running in an embedded partition, virtual appliance or other service external to the OS. These cases will also benefit from embodiments of the invention by utilizing the stall behavior to adjust the new P-State value which is based on feedback information regarding the percent of time busy and current P-State. In some embodiments, methods other than using APERF and MPERF register values may be used in the P-State calculation. In these cases, a measurement of the stall behavior may be used in a similar fashion as described above to adjust the resulting calculation to account for stalling.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for selecting processor states on a platform, comprising:
   a processor having a circuitry for providing hardware feedback related to current processor frequency, processor state, and percentage of time the processor is busy;
   means for adjusting the hardware feedback based on processor stall time information and for updating the processor state based on the adjusted hardware feedback, the adjusting and updating being performed before an effective processor state is read by logic to update the processor state;
   the means for adjusting and updating further comprises, logic to modify a value for a first machine state register before allowing one or more actors to use the results of a calculation of a ratio of the first machine state register and a second machine state register, wherein the modification applies processor stall time information.

2. The system as recited in claim 1, wherein the means for adjusting and updating comprises the one or more actors to receive the hardware feedback and processor stall time information and to calculate a new processor frequency based on the hardware feedback and processor stall time information, and to initiate the new processor frequency in the processor.

3. The system as recited in claim 2, wherein the one or more actors are selected from the group consisting of an operating system; processor circuitry, a software agent internal to processor, a firmware service, an embedded partition agent, a virtual appliance agent, a software agent external to an operating system, and circuitry external to the processor.

4. The system as recited in claim 1, wherein the one or more actors is selected from a group consisting of an operating system; processor circuitry, a firmware service, an embedded partition agent, a virtual appliance agent, a software agent external to an operating system, and circuitry external to the processor.

5. The system as recited in claim 1, wherein a target P-State (P-State$_{target}$) for updating the processor state is to be determined by a calculation of the product of a percentage of time the processor is busy (% Busy) and an effective P-State (P-State$_{effective}$) according to P-State$_{target}$←% Busy* P-State$_{effective}$, where the P-State$_{effective}$ depends on processor stall time information, current P-State and maximum frequency of the processor.

6. The system as recited in claim 5, wherein a target cycle count of the processor (C0$_{target}$) is determined by a calculation of $$C0_{target} = \frac{C0_{P0}}{Perf_{loss}\left(1 + \frac{C0_{stalls}}{(C0_i - C0_{stalls})}\frac{C0_{P0}}{C0_i}\right) + 1},$$

where C0$_i$ represents a current cycle count, C0$_{P0}$ represents a maximum frequency cycle count, C0$_{stalls}$ represents a cycle count during processor stall time, and Perf$_{loss}$ is a predetermined acceptable execution time performance loss percentage, and wherein C0$_{target}$ is returned as the modified IA32_APERF value.

7. The system as recited in claim 1, wherein the first machine state register (MSR) is an IA32_APERF MSR and the second machine state register is an IA32_MPERF MSR, where IA32_APERF counts at the actual processor frequency, and IA32_MPERF counts at a maximum processor frequency, so that a product of a ratio of IA32_APERF/IA32_MPERF and a percentage of time that the processor is busy comprises an effective P-State of the processor before modification of the IA32_APERF, and a modified IA32_APERF register is reduced based on processor stall time information and results in a target P-State that is lower, but within an acceptable level of performance loss.

8. The system as recited in claim 1, wherein the means for updating the processor state, further comprises:
   logic to modify a result of calculating a ratio of a first machine state register and a second machine state register, wherein the modification is based on processor stall time information.

9. The system as recited in claim 1, wherein the means for updating the processor state, further comprises:
   logic to modify a value for a first machine state register before using the results of a calculation of a ratio of the first machine state register and a second machine state register, wherein the modification applies a counter reflecting processor stall time information.

10. A method for selecting processor states on a platform, comprising:
    receiving from a processor on the platform, hardware feedback related to current processor frequency, processor state, and percentage of time the processor is busy;
    adjusting the hardware feedback based on processor stall time information and updating the processor state based on the adjusted hardware feedback, the adjusting and updating being performed before an effective processor state is read by logic to update the processor state;
    the updating further comprises: modifying a value for a first machine state register before calculating a ratio of the first machine state register and a second machine state register, wherein the modification applies processor stall time information.

11. The method as recited in claim 10, further comprising:
    calculating a new processor frequency based on the feedback and processor stall time information; and
    initiating the new processor frequency in the processor.

12. The method as recited in claim 11, wherein the calculating and initiating is performed by one or more actors selected from the group consisting of an operating system; processor circuitry, a software agent internal to processor, a firmware service, an embedded partition agent, a virtual appliance agent, a software agent external to an operating system, and circuitry external to the processor.

13. The method as recited in claim 10, further comprising: determining a target P-State (P-State$_{target}$) for updating the processor frequency as a product of a percentage of time the processor is busy (% Busy) and an effective P-State (P-State$_{effective}$) according to P-State$_{target}$←% Busy* P-State$_{effective}$, where the P-State$_{effective}$ depends on the processor stall time information, current P-State and maximum frequency of the processor.

14. The method as recited in claim 13, further comprising: calculating a target cycle count of the processor (C0$_{target}$) is according to $$C0_{target} = \frac{C0_{P0}}{Perf_{loss}\left(1 + \frac{C0_{stalls}}{(C0_i - C0_{stalls})}\frac{C0_{P0}}{C0_i}\right) + 1},$$

where C0$_i$ represents a current cycle count, C0$_{P0}$ represents a maximum frequency cycle count, C0$_{stalls}$ represents a cycle count during processor stall time, and Perf$_{loss}$ is a predetermined acceptable execution time performance loss percentage, and wherein $C0_{target}$ is returned as the modified IA32_APERF value.

15. The method as recited in claim 10, wherein the means for updating the processor state, further comprises:
modifying a result of calculating a ratio of a first machine state register and a second machine state register, wherein the modification is based on processor stall time information.

16. A non-transitory machine readable storage medium having instructions stored therein for selecting processor states on a platform, that when the instructions are executed on a machine, cause the machine to: receive from a processor on the platform, hardware feedback related to current processor frequency, processor state, and percentage of time the processor is busy;
adjust the hardware feedback based on processor stall time information and update the processor state based on the adjusted hardware feedback, the adjusting and updating being performed before an effective processor state is read by an logic to update the processor state;
the updating further comprises instructions to: modify a value for a first machine state register before calculating a ratio of the first machine state register and a second machine state register, wherein the modification applies processor stall time information.

17. The medium as recited in claim 16, further comprising instruction to:
calculate a new processor frequency based on the feedback and processor stall time information; and
initiate the new processor frequency in the processor.

18. The medium as recited in claim 17, wherein the calculating and initiating is to be performed by one or more actors selected from the group consisting of an operating system; processor circuitry, a software agent internal to processor, a firmware service, an embedded partition agent, a virtual appliance agent, a software agent external to an operating system, and circuitry external to the processor.

19. The medium as recited in claim 16 further comprising instructions to: determine a target P-State ($\text{P-State}_{target}$) for updating the processor frequency as a product of a percentage of time the processor is busy (% Busy) and an effective P-State ($\text{P-State}_{effective}$) according to $\text{P-State}_{target} \leftarrow \%$ Busy*$\text{P-State}_{effective}$, where the $\text{P-State}_{effective}$ depends on the processor stall time information, current P-State and maximum frequency of the processor.

20. The medium as recited in claim 19, further comprising instructions to:
calculate a target cycle count of the processor ($C0_{target}$) is according to $$C0_{target} = \frac{C0_{P0}}{Perf_{loss}\left(1 + \frac{C0_{stalls}}{(C0_i - C0_{stalls})} \frac{C0_{P0}}{C0_i}\right) + 1},$$

where $C0_i$ represents a current cycle count, $C0_{P0}$ represents a maximum frequency cycle count, $C0_{stalls}$ represents a cycle count during processor stall time, and $Perf_{loss}$ is a predetermined acceptable execution time performance loss percentage, and wherein $C0_{target}$ is returned as the modified IA32_APERF value.

21. The medium as recited in claim 16, wherein the updating the processor state, further comprises instructions to:
modify a result of calculating a ratio of a first machine state register and a second machine state register, wherein the modification is based on processor stall time information.

* * * * *